United States Patent [19]

Haines

[11] 3,914,587

[45] Oct. 21, 1975

[54] CALCULATOR HAVING A MEMORY PRESET KEY

[75] Inventor: Ralph W. Haines, Sunnyvale, Calif.

[73] Assignee: Rockwell International Corporation, El Segundo, Calif.

[22] Filed: Mar. 29, 1974

[21] Appl. No.: 456,414

[52] U.S. Cl. .............................................. 235/156

[51] Int. Cl.[2] .......................................... G06F 7/38

[58] Field of Search ........... 235/156, 160, 159, 164; 340/172.5, 365 R

[56] References Cited

UNITED STATES PATENTS

| | | | |
|---|---|---|---|
| 3,597,600 | 8/1971 | Herendeen et al. | 235/156 |
| 3,762,637 | 10/1973 | Hernandez | 235/156 |
| 3,775,601 | 11/1973 | Hatano et al. | 235/156 |
| 3,781,820 | 12/1973 | Cochran et al. | 340/172.5 |

*Primary Examiner*—David H. Malzahn

*Attorney, Agent, or Firm*—G. Donald Weber, Jr.; H. Fredrick Hamann; Morland Charles Fischer

[57] ABSTRACT

The number of control keys necessary to operate a four function calculator having $x$ and $y$ and memory registers is reduced by a memory preset key.

7 Claims, 1 Drawing Figure

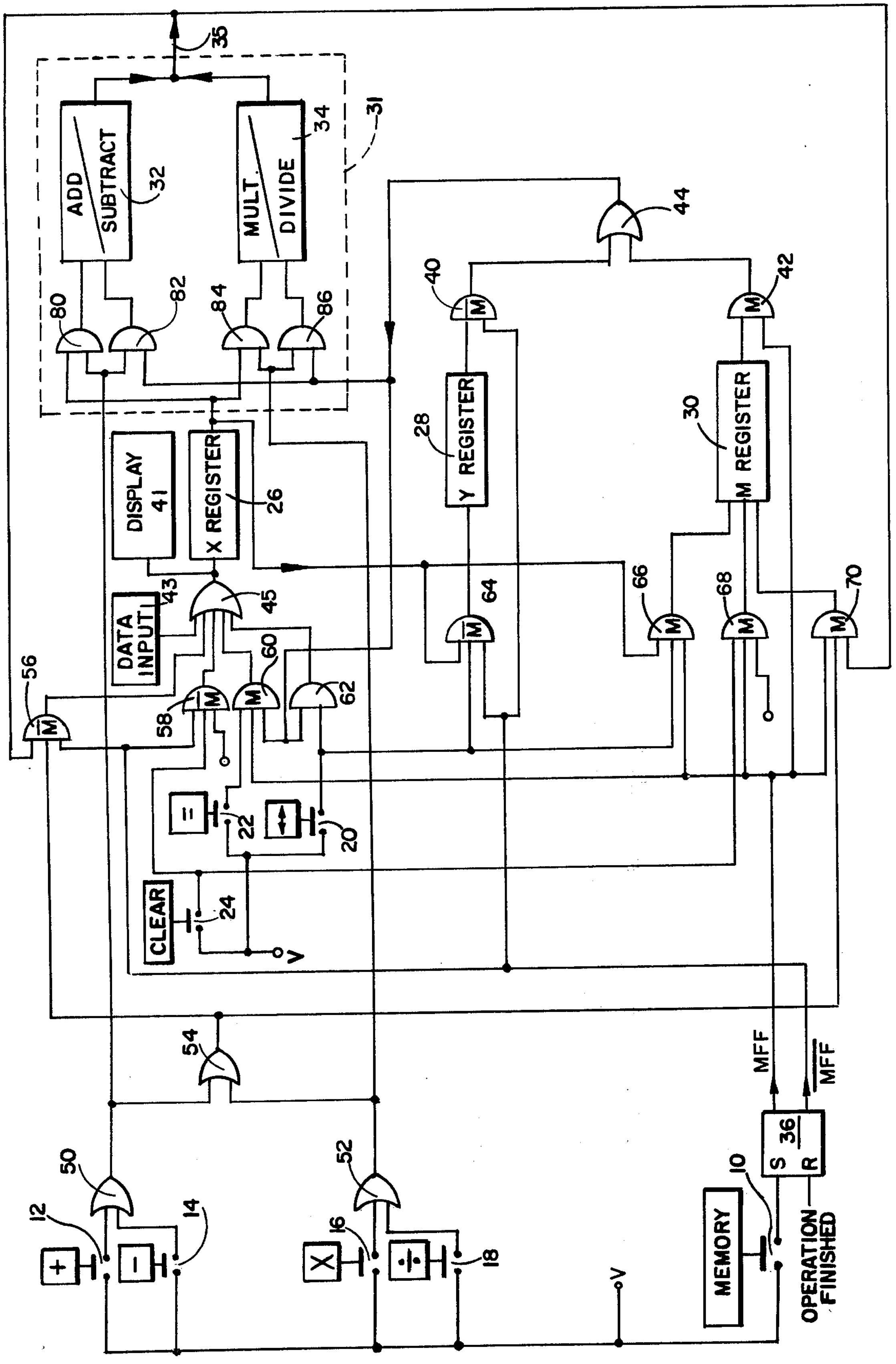
ADD
SUBTRACT
MULT.
DIVIDE
DISPLAY 41
X REGISTER
Y REGISTER
M REGISTER
DATA INPUT
CLEAR
MEMORY
OPERATION FINISHED
MFF
S
R
36
V

CALCULATOR HAVING A MEMORY PRESET KEY

BACKGROUND OF THE INVENTION

1. Field of the Invention

The invention relates to the field of electronic calculators and more particularly to electronic calculators having two registers plus a memory register.

2. Description of Prior Art

Prior art accumulating memory electronic calculators employing integrated circuits have been limited in the degree of miniaturization of the complete calculator by virtue of the high number of keys required for operating the calculator. These calculators have required ten digit keys (0, 1, 2, 3, 4, 5, 6, 7, 8, and 9) and as many as 12 control keys such as addition (+), subtraction (−), exchange (↔), equals (=), clear, multiplication (×), division (÷), memory addition (M+), memory subtraction (M−), memory exchange (M↔), memory equals (M=), and memory clear. The requirement that there be 22 manually operable keys to properly control operation of the calculator places severe restrictions on the minimum size of the calculator. In addition, the large number of operation keys complicates operation of the calculator.

SUMMARY OF THE INVENTION

The above problems with the prior art calculator keyboards are minimized in accordance with the invention by providing a memory key which presets the calculator to treat the next following control key actuation as a memory operation. The memory key sets a memory flip-flop, the state of which controls the meaning of the first control key pressed thereafter.

BRIEF DESCRIPTION OF THE DRAWING

The single FIGURE is a schematic diagram of an operation preset system in accordance with the invention.

DETAILED DESCRIPTION OF THE PREFERRED EMBODIMENT

Reference is here made to the figure which is a schematic diagram of the operation preset system of the present invention.

The system employs a plurality of control key switches eight of which are illustrated including a memory key switch 10, an addition key switch (+) 12, a subtract key switch (−) 14, a multiply key switch (×) 16, a divide key switch (÷) 18, an exchange key switch (↔) 20, an equals key switch (=) 22 and a clear key switch 24. Among other components, the calculator employs an X register 26, a Y register 28, an M register (memory register) 30, and an arithmetic unit 31 comprised of an add/subtract unit 32 and a multiply/divide unit 34. A utilization device 41 which may be a display, a printer or other data output device is also employed along with a data input device 43 which may be a keyboard.

Data input device 43 provides input data to OR gate 45 and thus to X register 26 whenever data is to be entered into the calculator. The utilization device is provided with the same data as is in the X register for output purposes.

Normally open memory key switch 10 has one contact thereof connected to a source of reference potential V corresponding to a logical "1". The other terminal of switch 10 is connected to the Set input terminal of the Set/Reset memory flip-flop 36. Thus, when memory key switch 10 is closed, a signal is applied to the set input terminal to place memory flip-flop 36 in the Set state. Conversely, memory flip-flop 36 is placed in the Reset state by application of an appropriate signal, such as an "operation finished" signal to the Reset terminal of the flip-flop. The operation finished signal is generated (by circuitry which is not shown) upon the conclusion of an operation. Memory flip-flop 36 has two outputs. A first, designated MFF, is true when flip-flop 36 is set and is false when flip-flop 36 is not set. The second output, designated $\overline{MFF}$, is false when memory flip-flop 36 is set and is true when memory flip-flop 36 is in its reset condition. The state of memory flip-flop 36 controls whether an operation is performed using the contents of Y register 28 or the memory (M) register 30.

The MFF and $\overline{MFF}$ outputs of memory flip-flop 36 each control the enabling of a plurality of AND gates. For convenience, those AND gates to which the MFF output provides an enabling signal when MFF is true, have a capital "M" within the gate in the figure and comprise gates 42, 60, 66, 68, and 70. Those AND gates to which the $\overline{MFF}$ output provides an enabling signal have a "$\overline{M}$" within the gate in the figure and comprise gates 40, 56, 58, and 64.

Each of the operation key switches (+, −, ×, ÷, ↔, =, and CLEAR) has one contact thereof connected to the source of a reference potential V. Normally-open addition key switch 12, when closed, applies a true value to one input terminal of an OR gate 50. Normally-open subtraction key switch 14, when closed, applies a true value to the other input terminal of OR gate 50. The output of OR gate 50 is true if, and only if, an addition or subtraction switch has been closed, thus indicating that an addition or subtraction operation is to be performed.

Normally-open multiplication key switch 16, when closed, applies a true voltage value to one input terminal of an OR gate 52. Normally-open division key switch 18, when closed, applies a true voltage value to the other input terminal of OR gate 52. OR gate 52 provides a true output if and only if a multiplication or division switch has been closed, thus indicating that a multiplication or division operation is to be performed.

A two input OR gate 54 has one input terminal connected to the output terminal of OR gate 50 and the other input terminal connected to the output terminal of OR gate 52. OR gate 54 produces a true voltage value at its output terminal whenever OR gate 50 or OR gate 52 produces a true output, that is whenever an arithmetic (addition, subtraction, multiplication, or division) operation has been selected to be performed.

A three input AND gate 56 controls the application of the output from an arithmetic unit 31 to an OR gate 45 which provides the input signal to X register 26 and utilization device 41. The first input terminal of AND gate 56 is connected to the output terminal 35 of the arithmetic unit 31 which will be described hereinafter. A second input terminal of AND gate 56 is connected to the output terminal of OR gate 54. The connection of the output terminal of OR gate 54 to an input terminal of ANd gate 56 assures the output of the arithmetic unit can be applied to the X register only when an arithmetic operation has been performed. The third input terminal of AND gate 56 is connected to the $\overline{MFF}$ output terminal flip-flop 36. The connection of the $\overline{MFF}$ output terminal of memory flip-flop 36 to an input terminal of AND gate 56 allows the application of the output of the arithmetic unit to the X register only when $\overline{MFF}$ is true, which occurs only when memory flip-flop 36 is in its reset condition (that is, when memory key switch 10 has not been actuated). Thus, AND gate 56 applies the output signal from arithmetic unit 31 to the X register 26 if and only if memory switch 10 has not been actuated and an arithmetic operation has been performed.

Normally-open clear key switch 24 is connected to one of the input terminals of a three input AND gate 58 and when closed applies a true voltage potential to that terminal. A second input terminal of AND gate 58 is connected to the $\overline{MFF}$ output terminal of memory flip-flop 36. A third input terminal of AND gate 58 is connected to a source of a zero value data signal. The output terminal of AND gate 58 is connected to an input terminal of OR gate 45. In this way, when memory key switch 10 has not been actuated and clear key switch 24 is actuated, all zeroes are written into X register 26.

Normally-open equals key switch 22 is connected to a first of the input terminals of a three input AND gate 60. When equals key switch 22 is closed, it applies a true voltage value to the first input terminal of AND gate 60, thereby providing one of the enabling signals required to enable gate 60. A second input terminal of AND gate 60 is connected to the MFF output terminal of memory flip-flop 36 which when the MFF output is true provides the second enabling signal required to enable gate 60. The third input terminal of AND gate 60 is connected to the output terminal of OR gate 44. The output signal from OR gate 44 comprises the data stored in the Y register or the M register, in accordance with the state of memory flip-flop 36. The output terminal of AND gate 60 is connected to an input terminal of OR gate 45. In this way, the actuation of equals key switch 22 when memory key switch 10 has been depressed causes the output of OR gate 44 to be applied to X register 26.

Normally-open exchange key switch 20 when closed applies a true value to one input terminal of a two input AND gate 62 thereby enabling the gate. The other input terminal of AND gate 62 is connected to the output terminal of OR gate 44. The output terminal of AND gate 62 is connected to an input terminal of OR gate 45. This connection of AND gate 62 implements the writing of the output signal from OR gate 44 into X register 26, when exchange key 20 is actuated, thus transferring to the X register the data in the memory register 30 or Y register 28 in accordance with whether or not memory key switch 10 was actuated.

A three input AND gate 64 has a first input terminal thereof connected to the output terminal of X register 26 in order to receive the information stored in X register 26 when register 26 is cycled. A second input terminal of AND gate 64 is connected to the output terminal of exchange key switch 20 to receive a true value upon the actuation of exchange key 20. The third input terminal of AND gate 64 is connected to the $\overline{MFF}$ output terminal of memory flip-flop 36. The output terminal of AND gate 64 is connected to the input terminal of Y register 28. When true values are present at both the second and third input terminals of AND gate 64, gate 64 is enabled to pass the data from X register 26 to Y register 28. Thus, AND gate 64 implements the writing of the information present in the X register 26 into Y register 28 when memory key switch 10 has not been actuated and the exchange key 20 is actuated.

A three input AND gate 66 has one input terminal thereof connected to the output terminal of X register 26 for receiving information stored in X register 26. A second input terminal thereof is connected to the output terminal of exchange key switch 20 to receive a true voltage value when the exchange key is actuated. The third input of AND gate 66 is connected to the MFF output terminal of memory flip-flop 36. The output terminal of AND gate 66 is connected to the input terminal of M register 30. When true values are present at both the second and third input terminals of AND gate 66, gate 66 is enabled to pass the data from X register 26 to M register 30. Thus, AND gate 66 implements the transfer of the information in X register 26 to memory register 30 when the memory key switch 10 has been actuated followed by actuation of exchange key 20.

A three input AND gate 68 has a first input terminal thereof connected to the output terminal of clear key switch 24. A second input terminal thereof is connected to the MFF output terminal of memory flip-flop 36 and the third input terminal thereof is connected to a source of an all zeroes data signal. The output terminal of AND gate 68 is connected to the input terminal of memory register 30. When true values are present at the first and second input terminals of AND gate 68, gate 68 is enabled to supply an all zeroes input to memory register 30. Thus, AND gate 68 implements the writing of all zeroes into memory register 30 when memory key 10 has been actuated and clear key 24 is then actuated.

A three input AND gate 70 has a first input terminal thereof connected to the MFF output terminal of memory flip-flop 36, a second input terminal thereof is connected to the output of OR gate 54 and the third input thereof is connected to the output terminal 35 of arithmetic unit 31. The output terminal of AND gate 70 is connected to the input terminal of memory register 30. When true values are applied at the first and second input terminals of AND gate 70, gate 70 is enabled to pass the data from arithmetic unit 31 to memory register 30. Thus, AND gate 70 implements the writing of the result of an arithmetic operation into memory register 30 when memory key switch 10 has been actuated prior to the actuation of the arithmetic operation (addition, subtraction, multiplication or division) key switch (12, 14, 16, or 18, respectively).

Within arithmetic unit 31, two two-input AND gates 80 and 82 each having one input terminal connected to the output terminal of addition/subtraction OR gate 50 are enabled whenever the output of OR gate 50 is true. The second input terminal of AND gate 80 is connected to the output terminal of X register 26 and the second input terminal of AND gate 82 is connected to the output terminal of OR gate 44. The connection of AND gates 80 and 82 implements control of the application of data to the add/subtract unit 32 whenever an addition or subtraction is to be performed. The actual calculation is performed under the control of circuitry which is not shown.

A second set of two-input AND gates 84 and 86 within arithmetic unit 31, each have one input terminal connected to the output terminal of OR gate 52 and are enabled whenever the output of OR gate 52 is true. The second input terminal of AND gate 84 is connected to the output terminal of X register 26. The second input terminal of AND gate 86 is connected to the output terminal of OR gate 44. This connection of AND gates 84 and 86 implements control of the application of data to the multiply/divide unit 34 whenever a multiplication or division operation is to be performed. Here again, the actual multiplication or division is performed under the control of additional circuitry which is not shown. The output terminals of add/subtract unit 32 and multiply/divide unit 34 are connected to an output terminal 35 of arithmetic unit 31. Output terminal 35 is connected to one input of AND gate 56 and one input of AND gate 70 so that the result of any arithmetic operation can be entered into the appropriate register (X or memory, respectively) on completion of the arithmetic operation. When the memory key switch 10 is actuated, AND gate 70 is enabled so that the result of the arithmetic calculation is written into memory register 30. When memory switch key 10 has not been actuated, AND gate 56 is enabled so that the result of the arithmetic calculation is written into X register 26.

The preferred embodiment of the invention operates in the following fashion. When memory key switch 10 is actuated, memory flip-flop 36 is set and the MFF output of flip-flop 36 becomes true and the $\overline{MFF}$ output flip-flop 36 becomes false. This provides an enabling signal to one of the inputs of each of the AND gates 42, 60, 66, 68, and 70. This is the only enabling signal which is required to enable AND gate 42. Consequently when memory register 30 is cycled, the output of memory register 30 will be fed to the output terminal of AND gate 42 and thus to the output terminal of OR gate 44 and to the various gates to which the output terminal of OR gate 44 is connected.

Which of the AND gates 60, 66, 68 and 70 is in fact enabled depends on what other control key is depressed. If any arithmetic key (12, 14, 16 and 18) is actuated, AND gate 70 is enabled because that produces a true output at the output terminal of OR gate 54 which provides a second enabling input signal to AND gate 70. In addition, either AND gates 80 and 82 or 84 and 86 are enabled to allow the output from X register 26 and OR gate 44 to be passed to the arithmetic unit for a calculation to be performed. Under these conditions, the data at the arithmetic unit output terminal 35 is passed to the M register 30 for storage therein. The original content of M register 30 is lost because the content of M register 30 has been entered only in arithmetic unit 31. When AND gate 70 is enabled, AND gates 60, 66, and 68 are not enabled.

If exchange key switch 20 is actuated then AND gate 66 receives a second enabling signal therefrom. This enables AND gate 66 to pass the data which is read out of X register 26 when X register 26 is cycled by control circuitry which is not shown. The data passed by gate 66 is applied to M register 30 where the data is stored. Under these conditions AND gates 60, 68 and 70 are not enabled.

If, instead, equals key switch 22 is actuated, then AND gate 60 is enabled with the result that the output of OR gate 44 (the contents of M register 30) are passed to X register 26 where they are stored. Under these conditions AND gates 66, 68, and 70 are not enabled. Because none of the AND gates (64, 66, 80 and 84) which receive the output of X register 26 are enabled, the original content of X register 26 is lost.

It will be noted that only the depression of exchange key 20 is required to enable AND gate 62, the second input terminal of which is connected to the output of OR gate 44. Consequently, whenever exchange key 20 is depressed, the output of OR gate 44 will be passed to the X register 26 by AND gate 62. This results in X register 26 storing the information which was previously in whichever of Y register 28 or memory register 30 has been fed to OR gate 44 by AND gates 40 and 42, in accordance with the state on memory flip-flop 36.

If clear key 24 is actuated, AND gate 68 is enabled with result that a zero is written into M register 30. Under these conditions AND gates 60, 66 and 70 are not enabled. Because none of the AND gates (60, 62, 82 and 86) which receive the output of OR gate 44 is enabled under these conditions, the previous content of M register 30 is lost.

At the end of any of the above operations, an "operation finished" signal is generated by circuitry not shown. The "operation finished" signal applied to the reset input of memory flip-flop 36 resets memory flip-flop 36. As a result of the resetting of memory flip-flop 36, the MFF output signal goes false and the $\overline{MFF}$ signal becomes true.

If during the period that the $\overline{MFF}$ output signal from memory flip-flop 36 is true, one of the keys 12, 14, 16, 18, 20, 22 or 24 is depressed, then an operation not involving memory register 30 is performed. When $\overline{MFF}$ is true, AND gates 40 56, 58, and 64 receive an enabling signal. AND gate 40 requires no further input signal to enable it, since it is a two input AND gate. Under these conditions whenever the Y register 28 is cycled, the output signal from the Y register will be passed through AND gate 40 and OR gate 44 for application to the gates connected to the output terminal of OR gate 44. Which of the other AND gates (56, 58 and 64) is in fact enabled depends on the further inputs thereto. If an arithmetic key 12, 14, 16, or 18 is actuated, the output of OR gate 54 is true which provides a seocnd enabling signal to AND gate 56. Under these conditions, AND gate 56 is enabled and the output signal from arithmetic unit 31 is passed to AND gate 56 and stored in X register 26 when the operation is performed.

If clear key switch 24 is actuated, then a second enabling signal is applied to AND gate 58. This enables AND gate 58 which provides a zero data signal which is written into X register 26 when that register is cycled. Under these conditions, the output of X register 26 is not applied to any enabled gates and the information previously stored in X register 26 is lost.

Actuation of exchange key switch 20 applies a second enabling signal to AND gate 64. This allows data from X register 26 to be written into Y register 28 when the registers are cycled.

Actuation of equals key switch 22 causes the calculator to perform whatever arithmetic operation it is set to perform.

An operation control system in accordance with the invention has been described. This system reduces the number of keys required to control a complete set of operations in a memory calculator. Included within this reduction of keys is also a possible increase in the number of available operations by inclusion of the ability to perform memory divisions and memory multiplications. If it is not desired to perform memory multiplications or divisions then OR gate 52, AND gate 84, AND gate 86 and OR gate 54 may be omitted. In this case, the output terminal of OR gate 50 is connected to the input terminals of AND gate 56 and AND gate 70 which, in the embodiment shown and described, are connected to the output of OR gate 54.

It will be understood, that the actuation of the operation keys described above initiates other operations in addition to those which have been described above. These additional operations inter alia include initiating the transfer of data among the various registers and the arithmetic units and other operations normally performed in a calculator. These additional operations have not been described herein in order to maintain the clarity of the discussion of this invention.

Thus, there has been shown and described a preferred embodiment of the instant invention. This embodiment is not intended to be limitative but is illustrative. Those skilled in the art may be able to modify the embodiment described. Nevertheless, any modifications flowing within the purview of the description are intended to be included within the scope of this invention which is limited only by the claims appended hereto.

I claim:

1. In a device which performs a plurality of operations on data, a combination comprising:

a first register having respective input terminals and an output terminal;

flip-flop means having first and second output terminals, said first output terminal for providing a first true signal when said flip-flop means is in a set state, said second output terminal for providing a second true signal when said flip-flop means is in a reset state, said flip-flop means being in said reset state upon completion of every operation;

actuation means connected to said flip-flop means for placing said flip-flop means in said set state;

operation means for selectively providing a plurality of respective third true signals;

first gate means having respective inputs connected to said operation means and said first output terminal of said flip-flop means, said first gate means having respective outputs connected to said respective input terminals of said first register, said first gate means for permitting entry of data into said first register upon application of one of said respective third true signals to said first gate means provided said flip-flop means is in a set state; and second gate means connected to said first output terminal of said flip-flop means and said output terminal of said first register, said second gate means for permitting transfer of data from said first register to other parts of the device provided said flip-flop means is in a set state.

2. The combination recited in claim 1 further comprising:

a second register;

third gate means having respective inputs connected to said operations means and said second output terminal of said flip-flop means, said third gate means for permitting entry of data into said second register upon application of one of said respective third true signals to said third gate means provided said flip-flop means is in a reset state; and fourth gate means connected to said second output terminal of said flip-flop means, said fourth gate means for permitting transfer of data from said second register to other parts of the device provided said flip-flop is in a reset state.

3. The combination as recited in claim 2 further comprising:

a third register; and fifth gate means having respective inputs connected to said operations means and said first and second output terminals of said flip-flop means, said fifth gate means for permitting entry of various data into said third register upon actuation of said operation means in accordance with the state of said flip-flop means.

4. The combination recited in claim 3 comprising an arithmetic unit for performing arithmetic operations on data in said third register and data transferred from either said first or second registers in accordance with the state of said flip-flop means;

said operation means includes an addition switch, a subtraction switch, a multiplication switch, and a division switch, upon actuation of any one of said respective switches, a respective third true signal is applied to said first and fifth gate means;

said first gate means then permitting the output of said arithmetic unit to be entered in said first register provided said flip-flop means is in a set state; and said fifth gate means then permitting the output of said arithmetic unit to be entered in said third register provided said flip-flop means is in a reset state.

5. The combination recited in claim 3 wherein said operation means includes a clear switch, upon actuation of said clear switch, a respective third true signal is applied to said first and fifth gate means;

said first gate means then permitting said first register to be set to all zeroes provided said flip-flop means is in a set state; and said fifth gate means then permitting said third register to be set to all zeroes provided said flip-flop means is in a reset state.

6. The combination recited in claim 3 wherein said operation means includes an exchange switch, upon actuation of said exchange switch, a respective third true signal is applied to said first, third and fifth gate means;

said first gate means then permitting the data in said third register to be entered in said first register provided said flip-flop means is in a set state;

said third gate means then permitting the data in said third register to be entered in said second register provided said flip-flop means is in a reset state; and said fifth gate means then permitting either the data in said first register to be entered in said third register provided said flip-flop means is in a set state, or the data in said second register to be entered in said third register provided said flip-flop means is in a reset state.

7. The combination recited in claim 3 wherein said operation means includes an equals switch, upon actuation of said equals switch, a respective third true signal is applied to said fifth gate means, said fifth gate means then permitting the data in said first register to be entered in said third register provided said flip-flop means is in a set state.

* * * * *